May 24, 1932.　　　　J. L. PERKINS　　　　1,859,462

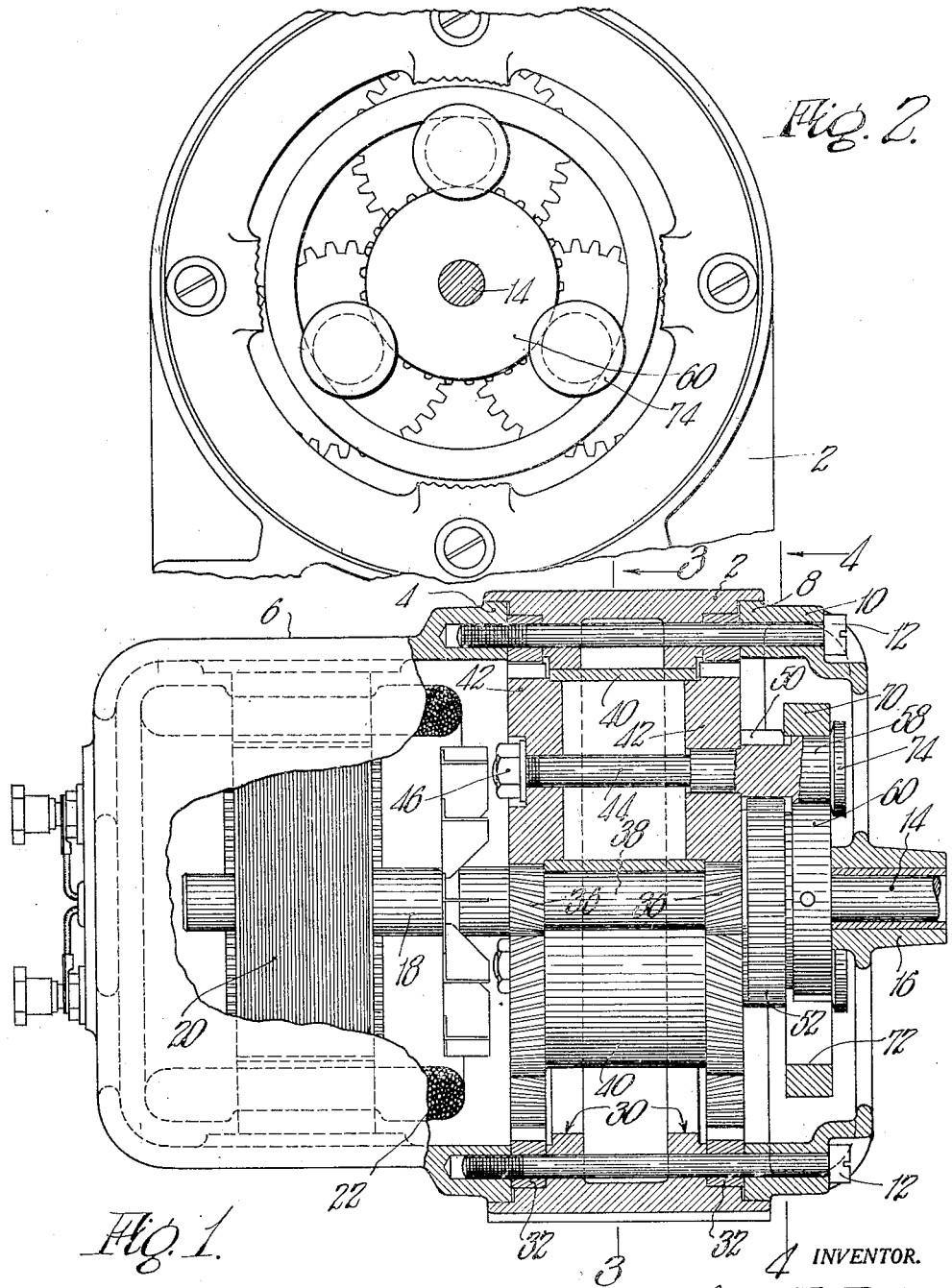

SPEED REDUCTION MECHANISM

Filed Jan. 14, 1931　　　2 Sheets-Sheet 2

INVENTOR.
Julian L. Perkins.
Walter C. Ross.
ATTORNEY.

Patented May 24, 1932

1,859,462

UNITED STATES PATENT OFFICE

JULIAN L. PERKINS, OF WEST SPRINGFIELD, MASSACHUSETTS

SPEED REDUCTION MECHANISM

Application filed January 14, 1931. Serial No. 508,711.

This invention relates to improvements in speed changing mechanism and is directed more particularly to improvements in mechanism to facilitate the connection of shafts so that one may drive the other at a different speed.

According to one object of the invention I provide a speed changing apparatus wherein rotating parts are supported for rotation by rolling on other parts as distinguished from structures wherein parts are mounted for rotation in bearings. In this way I obviate the necessity for bearings and consequently eliminate friction and its objections. This makes it possible to efficiently lubricate the parts if necessary, while the mechanism is adapted to operate at high speeds without injurious effects.

According to another feature of the invention the structure includes a shaft which is entirely supported by the mechanism itself without the necessity of journals therefor and according to the preferred form of the invention it is possible to carry on an end of said shaft a rotor of a motor or the like and to support the same in proper relation with respect to the stator of the motor and thereby eliminate the usual outboard bearings.

According to a further object of the invention novel frictionless means are provided to eliminate end thrust of the parts during their rotation, while other means are provided to likewise obviate radial thrust of the parts.

The objects of the invention are accomplished by the provision of a novel combination and arrangement of parts, the various novel features and advantages of which will be hereinafter more fully referred to in the following description of the invention in the form at present preferred, reference being had to the accompanying drawings, wherein:

Fig. 1 is a side elevational view of an apparatus embodying the novel features of the invention, with parts in section for clearness.

Fig. 2 is an end elevational view of the apparatus shown in Fig. 1, and

Figure 3:
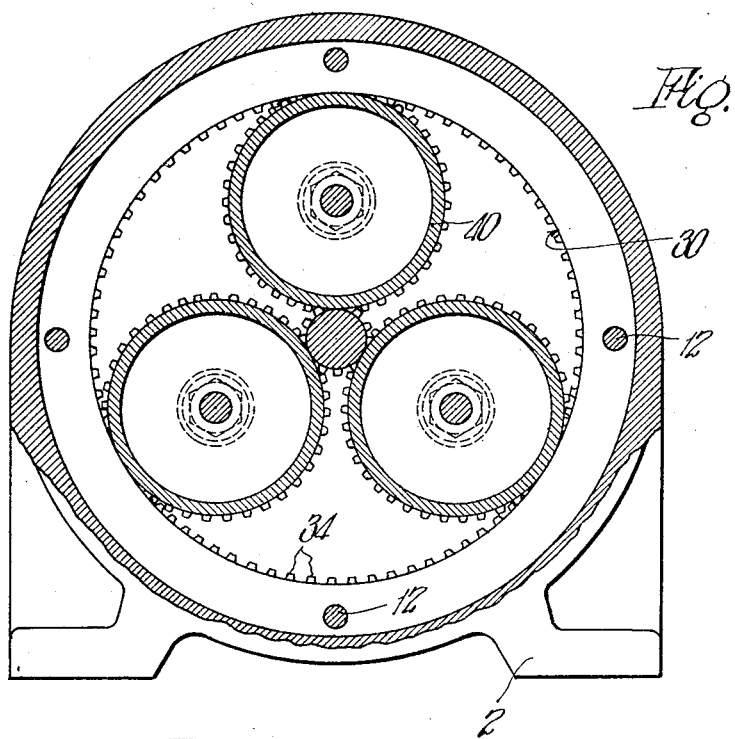
Figure 4:
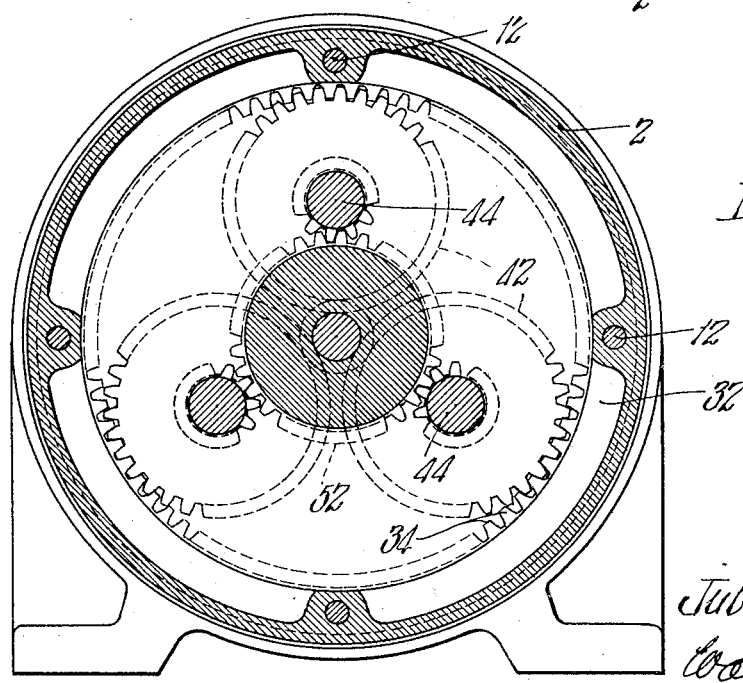

Figs. 3 and 4 are sectional elevation views taken on the lines 3—3 and 4—4 respectively of Fig. 1.

Referring now to the drawings more in detail the invention will be described.

The invention in the present preferred form thereof will be described in connection with the parts of a motor, but it will be understood that such description is not to be construed as a limitation of the invention as the mechanism constituting the invention is well adapted for use with other apparatus than a motor.

A frame or support 2 is provided which is in the form of an annulus and is adapted to receive in its opposite front and rear sides the forward end 4 of a motor frame 6 and the inner end 8 of a cap or cover 10. These parts are clamped together by means of clamp bolts 12 as shown so as to provide a rugged unified structure.

A shaft 14 which may be called a drive shaft is journalled in a bearing 16 of the cover 10. A shaft 18 has on its outer end a rotor 20 and a field 22 is carried by the motor frame 6. In the embodiment shown the shaft 18 will be rotated, and through the mechanism to be described the shaft 14 is driven at a speed different from that of the shaft 18 and can be utilized for driving some machine or apparatus.

If desired, the shaft 14 may be driven from some suitable force of power so that through the mechanism to be described, the shaft 18 will be operated at a different speed for rotating the rotor, and the rotor and stator operated as a generator.

The shaft 18 is supported entirely by the parts of the speed changing mechanism, so that a bearing on the outer end of shaft 18 may be eliminated. This will be desirable to avoid friction and its attendant disadvantages.

An interior circular raceway 30 is provided in the frame 2 and internal gears 32 at either side are clamped between the parts and held in place by the bolts 12 as shown. These gears 32 have teeth 34 on the inner peripheries thereof as is shown. A pair of pinions or gears 36 are carried by the shaft 18 in spaced relation at opposite ends of a central portion 38 and are in alignment with the teeth of gears 32.

Spools 40 are arranged to roll on and around the portion 38 of the shaft 18 and on the raceway 30 of the frame 2. Intermediate gears 42 at opposite ends of the spools 40 have teeth in meshing engagement with the gears 36 and with the teeth 34 of the gears 32 and are clamped to the ends of the spools by means of spindle bolts 44 having nuts 46 threaded on the outer ends thereof. Each spool and its pair of gears 42 constitute what may be termed gear assemblies and these assemblies are preferably spaced equidistant apart as shown.

The diameter of the portion 38 of the shaft 18 is preferably the same as that of the pitch diameters of the gears 36 and the outer diameters of the spools are preferably equal to the pitch diameters of the gears 42. Also the diameter of the raceway 30 corresponds to the pitch diameter of the gears 32.

By arranging the diameters of the contacting parts to agree with the pitch diameters of the intermeshing gears as stated the spools may roll around the shaft portion 38 and on the raceway 30 while the teeth of the gears intermesh with one another in the usual way. There will be no tendency for the teeth of one gear jamming into its mating gear, because the gears are held for their rolling action by the rolling surfaces of the parts associated therewith.

The teeth of the gears 32, 36 and 42 at one side of the portion 38 of shaft 18 are inclined opposite to the inclination of the teeth at the opposite side of said portion 38. This is so the gear assemblies and shaft 18 will be held against axial movement during their rotation and in that way the usual end thrust of the parts is obviated. It may be accounted for by the fact that the gear assemblies are held against endwise movements by the opposite inclination of the teeth of gears 42 and 32, while the shaft is held against such movements by the different inclinations of the teeth of gears 36 and 42.

As the shaft 18 is rotated the gears 36 will rotate the gear assemblies causing the gears 42 to rotate around the axis of the shaft 18. In this way the members 40 roll on the portion 38 of the central shaft and on the raceway 30.

The raceway 30 functions to confine the gear assemblies and overcomes any radial thrust thereof during the operation of the mechanism and since the parts are arranged for rolling one or the other friction is avoided whereby the parts may operate at high speed without injurious effects.

Not only then is it possible to obviate friction which is greatly desired, but the necessity for lubricant is reduced to the point where it may be readily supplied by the parts themselves, if in fact it is needed at all, and this is so regardless of the speed at which the parts operate.

A gear 52 is carried by the shaft 14 which meshes with gears 50 of the spindles 44 and roll members 58 of the spindles 44 are in rolling contact with a disk 60 on said shaft 14.

The diameter of the disk 60 corresponds to the pitch diameter of the gear 52, while the diameter of the rolls 58 is equal to the pitch diameters of the gears 50. In this way as the gear assemblies are rotated about the axis of the shaft the rolls 58 roll on the periphery of the disk 60.

A retainer ring 70 is provided which has an inner raceway 72 on which the rolls 58 have a rolling contact. This ring is adapted to confine the gear assemblies and cause the same to rotate about the axis of the shaft 18 in such a manner that any radial movement of the assemblies is overcome.

Flanges 74 are provided on the outer ends of spindles 44 and these in co-operation with the ends of the teeth of gears 50 hold the ring 70 against endwise movements. To reduce friction the inner faces of the flanges and ends of the teeth of gears 50 may be bevelled as shown. As the shaft 18 is rotated in one direction or the other the gears 36 rotate the gears 42 and because they are in mesh with the teeth 34 of the gears 32 the gear assemblies are caused to rotate about the axis of the shaft 18. The rotation of the gear assemblies causes the gear 52 to be rotated by gears 50 whereby a rotative movement is imparted to the shaft 14. In this way the shaft 14 is driven from the shaft 18. By varying the relative diameters of the parts and gears the speed ratio between the shafts 14 and 18 may be varied within wide limits.

The parts constituting the speed change mechanism are supported from one another and are in rolling contact for relative rotation to avoid friction. At the same time the parts are held against radial movements and are caused to rotate on a true axis, all to the end that the efficiency may result with high speed operation.

It will also be noted that the shaft is supported entirely by the mechanism in such a way as to obviate bearings while it in turn may support such a part as an armature or the like. In that way it is possible to eliminate the usual outboard bearing of the motor. By eliminating the bearings which are common in connection with rotating parts and especially where the parts operate at high speed, friction and the resulting lubricating and other difficulties are eliminated.

All of this makes it possible to provide a self-contained mechanism which may operate at extremely high speed and by reason of the novel construction the need for lubrication becomes insignificant as compared with the requirements for lubrication where parts rotate in bearings.

Various changes and modifications may be made in the form of an apparatus embodying the various novel features of the invention without departing from the spirit and scope thereof and therefore I prefer to be limited, if at all, by the appended claims rather than by the foregoing description.

What I claim is:

1. A mechanism of the class described comprising in combination, a support carrying a raceway and internal gears at opposite sides thereof, a shaft having pinions in alignment with said internal gears at opposite sides of a central portion thereof, pairs of intermediate gears about said shaft meshing with said internal gears and pinions, and cylindrical members between said pairs of gears in rolling contact with said raceway and said central portion of the shaft whereby the shaft is rotatably supported.

2. A mechanism of the class described comprising in combination, a support carrying a raceway and internal gears at opposite sides thereof, a shaft carrying pinions in alignment with said internal gears at opposite sides of a central portion, gear assemblies around said shaft, each including a pair of intermediate gears meshing with said internal gears and pinions and a cylindrical member between said gears in rolling contact with said raceway and said central portion of said shaft.

3. A mechanism of the class described comprising in combination, a support carrying a raceway and internal gears at opposite sides thereof, a shaft carrying pinions in alignment with said internal gears at opposite sides of a central portion, gear assemblies around said shaft, each including a pair of intermediate gears meshing with said internal gears and pinions and a cylindrical member between said gears in rolling contact with said raceway and said central portion of said shaft, a part carried by said support and a part carried by said shaft co-operating therewith.

4. A mechanism of the class described comprising in combination, a support carrying a raceway and internal gears at opposite sides thereof, a shaft carrying pinions in alignment with said internal gears at opposite sides of a central portion, gear assemblies around said shaft each including a pair of intermediate gears meshing with said internal gears and pinions and a cylindrical member between said gears in rolling contact with said raceway and said central portion of said shaft, a shaft journalled in a part of said support, a gear on said shaft and gears associated with said assemblies meshing therewith.

5. A mechanism of the class described comprising in combination, a support carrying a raceway and internal gears at opposite sides thereof, a shaft carrying pinions in alignment with said internal gears at opposite sides of a central portion, gear assemblies around said shaft each including a pair of intermediate gears meshing with said internal gears and pinions and a cylindrical member between said gears in rolling contact with said raceway and said central portion of said shaft, a shaft journalled in a part of said support, a gear on said shaft and gears associated with said assemblies meshing therewith, members associated with said last-named gears and shaft in rolling contact with one another.

6. A mechanism of the class described comprising in combination, a support carrying a raceway and internal gears at opposite sides thereof, a shaft carrying pinions in alignment with said internal gears at opposite sides of a central portion, gear assemblies around said shaft each including a pair of intermediate gears meshing with said internal gears and pinions and a cylindrical member between said gears in rolling contact with said raceway and said central portion of said shaft, a shaft journalled in a part of said support, a gear on said shaft and gears associated with said assemblies meshing therewith, members associated with said last-named gears and shaft in rolling contact with one another, and means confining said members to hold the same against radial displacement.

7. A mechanism of the class described comprising in combination, a support carrying a raceway and internal gears at opposite sides thereof, a shaft carrying pinions in alignment with said gears at opposite sides of a central portion and gear assemblies around said shaft each including a pair of intermediate gears meshing with said internal gears and pinions and a tubular member therebetween in rolling contact with said raceway and central portion of the shaft, a clamp member for clamping the pairs of intermediate gears to their respective tubular members.

8. A mechanism of the class described comprising in combination, a support carrying a raceway and internal gears at opposite sides thereof, a shaft carrying pinions in alignment with said gears at opposite sides of a central portion and gear assemblies around said shaft each including a pair of intermediate gears meshing with said internal gears and pinions and a tubular member therebetween in rolling contact with said raceway and central portion of the shaft, a clamp member for clamping the pairs of intermediate gears to their respective tubular members, a shaft journalled in a part of said support, a gear on said shaft and gears meshing therewith associated with said assemblies.

9. A mechanism of the class described comprising in combination, a support carrying a raceway and internal gears at opposite sides, thereof, a shaft carrying pinions in alignment with said gears at opposite sides of a central portion and gear assemblies around said shaft each including a pair of intermediate gears meshing with said internal gears and pinions and a tubular member therebetween in rolling contact with said raceway and central portion of the shaft, a clamp member for clamping the pairs of intermediate gears to their respective tubular members, a shaft journalled in a part of said support, a gear and a disc on said shaft, a gear and a roll member associated with said assemblies engaging said gear and disc of said shaft and a ring member in rolling contact with said rolls.

10. A mechanism of the class described comprising in combination, a support having an internal raceway, a shaft centrally thereof, cylindrical members between and in rolling contact with said raceway and shaft whereby the shaft is supported for rotation concentrically of said raceway, gears associated with said raceway and shaft non-rotatable relative thereto, intermediate gears associated with said cylindrical members non-rotatable relative thereto, a rotatable member, interengaging gears carried by said member and the associated intermediate gears and cylindrical members and parts associated with said-last named gears having surfaces in rolling contact.

11. A mechanism of the class described comprising in combination, a support having an internal raceway and internal gears associated therewith, a shaft carrying pinions, the said gears and pinions being disposed at opposite sides of said raceway, gear assemblies around said shaft each including a pair of intermediate gears and a cylindrical member, a member rotatable in a part of said support, intermeshing gears on said member and associated with said assemblies, roll members on said rotatable member and assemblies which are in rolling contact and a part around the roll members of said gear assemblies in rolling contact therewith.

In testimony whereof I affix my signature.

JULIAN L. PERKINS.